United States Patent
Funk

(10) Patent No.: US 10,219,453 B2
(45) Date of Patent: Mar. 5, 2019

(54) PLANT WATERING SYSTEM

(71) Applicant: Timothy Marvin Funk, Sparks, NV (US)

(72) Inventor: Timothy Marvin Funk, Sparks, NV (US)

(73) Assignee: Timothy M Funk, Sparks, NV (US)

( * ) Notice: Subject to any disclaimer, the term of this patent is extended or adjusted under 35 U.S.C. 154(b) by 356 days.

(21) Appl. No.: 15/089,248

(22) Filed: Apr. 1, 2016

(65) Prior Publication Data

US 2016/0286746 A1   Oct. 6, 2016

Related U.S. Application Data

(60) Provisional application No. 62/141,499, filed on Apr. 1, 2015.

(51) Int. Cl.
*A01G 29/00* (2006.01)
*A01G 25/06* (2006.01)

(52) U.S. Cl.
CPC .............. *A01G 29/00* (2013.01); *A01G 25/06* (2013.01)

(58) Field of Classification Search
CPC ........ A01G 29/00; A01G 25/06; A01G 25/02; A01G 27/02
See application file for complete search history.

(56) References Cited

U.S. PATENT DOCUMENTS

| | | | | |
|---|---|---|---|---|
| 1,052,121 A | * | 2/1913 | Austin | A01G 25/06 405/44 |
| 1,439,973 A | * | 12/1922 | Olson | A01G 25/06 405/36 |
| 1,576,790 A | * | 3/1926 | Roessner | A01G 25/06 405/44 |
| 2,817,956 A | * | 12/1957 | Frederick | A01G 25/06 405/45 |
| 3,220,194 A | * | 11/1965 | Lienard | A01C 23/042 405/45 |
| 3,407,608 A | * | 10/1968 | Whitehead | A01G 25/06 239/67 |
| 3,408,818 A | * | 11/1968 | Hemphill | A01G 25/06 405/37 |
| 3,762,437 A | * | 10/1973 | King, Sr. | A01G 25/06 137/512 |

(Continued)

FOREIGN PATENT DOCUMENTS

| | | | |
|---|---|---|---|
| DE | 2610384 A1 * | 9/1976 | A01G 25/06 |
| DE | 2748934 A1 * | 7/1979 | A01G 25/06 |

(Continued)

*Primary Examiner* — Kathleen I Alker
(74) *Attorney, Agent, or Firm* — Plager Schack LLP

(57) ABSTRACT

A plant watering system is adapted to provide water to a plant both at and below a ground surface. The plant watering system includes a passive water manifold, connected to a fill tube. A first reservoir is connected to the fill tube. A first reservoir first plurality of water seepage panels and a first reservoir second plurality of water seepage panels are formed within the first reservoir and configured to disperse water from the passive water manifold below the ground surface. A spraying manifold is attached to a sprayer tube. A coupler sprayer is mechanically coupled to the sprayer tube; wherein the coupler sprayer is configured to disperse water from the spraying manifold above the ground surface.

4 Claims, 5 Drawing Sheets

(56) References Cited

U.S. PATENT DOCUMENTS

| | | | | | |
|---|---|---|---|---|---|
| 4,156,324 | A | * | 5/1979 | Henttonen | A01G 25/06 405/43 |
| 5,133,622 | A | * | 7/1992 | Hewlett | A01G 25/06 405/39 |
| 5,507,595 | A | * | 4/1996 | Benson | A01G 25/06 405/269 |
| 5,752,784 | A | * | 5/1998 | Motz | A01G 25/06 405/37 |
| 5,795,100 | A | * | 8/1998 | Thomas | A01G 25/06 405/36 |
| 5,852,895 | A | * | 12/1998 | Sinanan | A01G 9/022 47/33 |
| 5,975,797 | A | * | 11/1999 | Thomas | A01G 25/06 405/36 |
| 6,036,104 | A | * | 3/2000 | Shih | A01G 25/02 137/78.3 |
| 6,237,283 | B1 | * | 5/2001 | Nalbandian | A01G 27/006 47/48.5 |
| 6,659,368 | B2 | * | 12/2003 | Capps | A01G 25/06 239/145 |
| 8,555,547 | B2 | * | 10/2013 | Hashimoto | A01G 9/045 47/79 |
| 9,821,335 | B2 | * | 11/2017 | Burrous | B05B 15/70 |
| 2009/0052990 | A1 | * | 2/2009 | Richardson | A01G 25/06 405/43 |
| 2010/0005716 | A1 | * | 1/2010 | Byles | A01G 9/00 47/48.5 |
| 2010/0025498 | A1 | * | 2/2010 | Cole | A01G 25/06 239/538 |
| 2010/0176216 | A1 | * | 7/2010 | Cheung | A01G 25/06 239/201 |

FOREIGN PATENT DOCUMENTS

| | | | | |
|---|---|---|---|---|
| WO | WO-8301364 A1 | * | 4/1983 | A01G 25/06 |
| WO | WO-0101758 A1 | * | 1/2001 | A01G 25/06 |

* cited by examiner

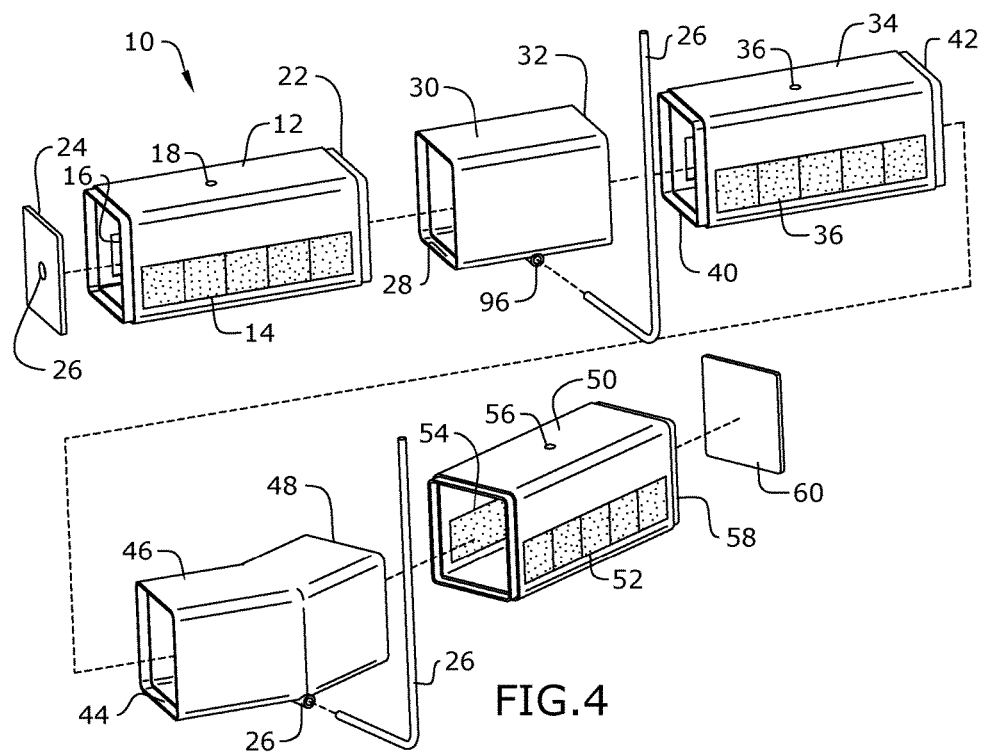
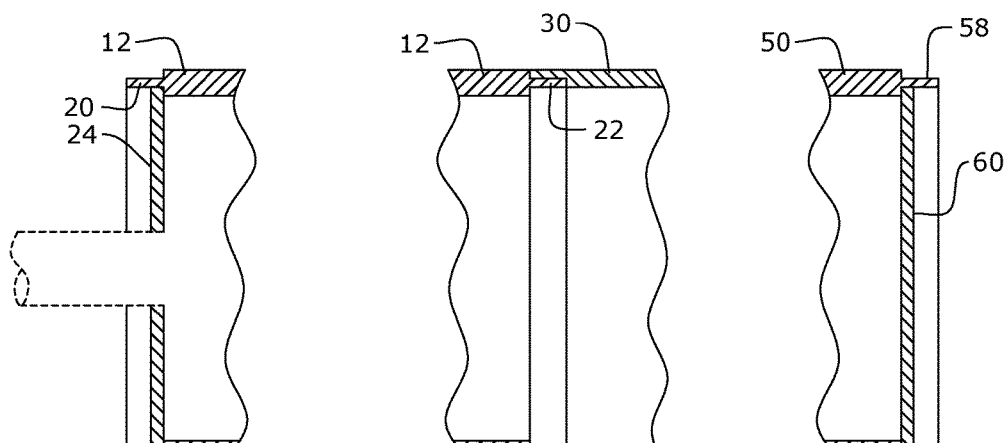
FIG.5    FIG.6    FIG.7

PLANT WATERING SYSTEM

RELATED APPLICATION

This application claims priority to provisional patent application U.S. Ser. No. 62/141,499 filed on Apr. 1, 2015, the entire contents of which is herein incorporated by reference.

BACKGROUND

The embodiments described herein relate generally to agriculture, and more particularly, to a device for resizing a ring.

Different plants and root systems require varying levels of watering. However, there are currently no variable density water delivery systems available.

Therefore, what is needed is a watering system for regulating the flow of water delivered to a plant's root system through the use of variable density panel inserts.

SUMMARY

A plant watering system is adapted to provide water to a plant both at and below a ground surface. The plant watering system includes a passive water manifold, connected to a fill tube. A first reservoir is connected to the fill tube. A first reservoir first plurality of water seepage panels and a first reservoir second plurality of water seepage panels are formed within the first reservoir and configured to disperse water from the passive water manifold below the ground surface. A spraying manifold is attached to a sprayer tube. A coupler sprayer is mechanically coupled to the sprayer tube; wherein the coupler sprayer is configured to disperse water from the spraying manifold above the ground surface.

In some embodiments, a coupler can be attached to the first reservoir. A coupler L-rod can be attached to the coupler with a coupler attachment point. A coupler tee joint can be attached to the sprayer tube and a first coupler sprayer tube. A coupler tube elbow can be attached to the first coupler sprayer tube and immediately adjacent to the coupler. A second coupler sprayer tube can be attached to the coupler tube elbow and the coupler sprayer.

In some embodiments, a second reservoir can be attached to the coupler. A second reservoir first plurality of water seepage panels and a second reservoir second plurality of water seepage panels can be formed within the second reservoir and configured to disperse the water from the passive water manifold below the ground surface.

In some embodiments, an elbow can be attached to the second reservoir. An elbow L-rod can be attached to the elbow with an elbow attachment point. An elbow tee joint can be attached to the sprayer tube and a first elbow sprayer tube. An elbow tube elbow can be attached to the first elbow sprayer tube and immediately adjacent to the elbow. A second elbow sprayer tube can be attached to the elbow tube elbow and an elbow sprayer. The elbow sprayer can be configured to disperse the water from the spraying manifold above the ground surface.

In some embodiments, a third reservoir can be attached to the coupler. A third reservoir first plurality of water seepage panels and a third reservoir third plurality of water seepage panels can be formed within the third reservoir and configured to disperse the water from the passive water manifold below the ground surface.

BRIEF DESCRIPTION OF THE FIGURES

The detailed description of some embodiments of the invention is made below with reference to the accompanying figures, wherein like numerals represent corresponding parts of the figures.

FIG. 4 shows a top perspective view of one embodiment of the present invention;

FIG. 5 shows a section view of one embodiment of the present invention along line 5-5 in FIG. 1;

FIG. 6 shows a section view of one embodiment of the present invention along line 6-6 in FIG. 1;

FIG. 7 shows a section view of one embodiment of the present invention demonstrating the end cap;

DETAILED DESCRIPTION OF CERTAIN EMBODIMENTS

Figure 1:
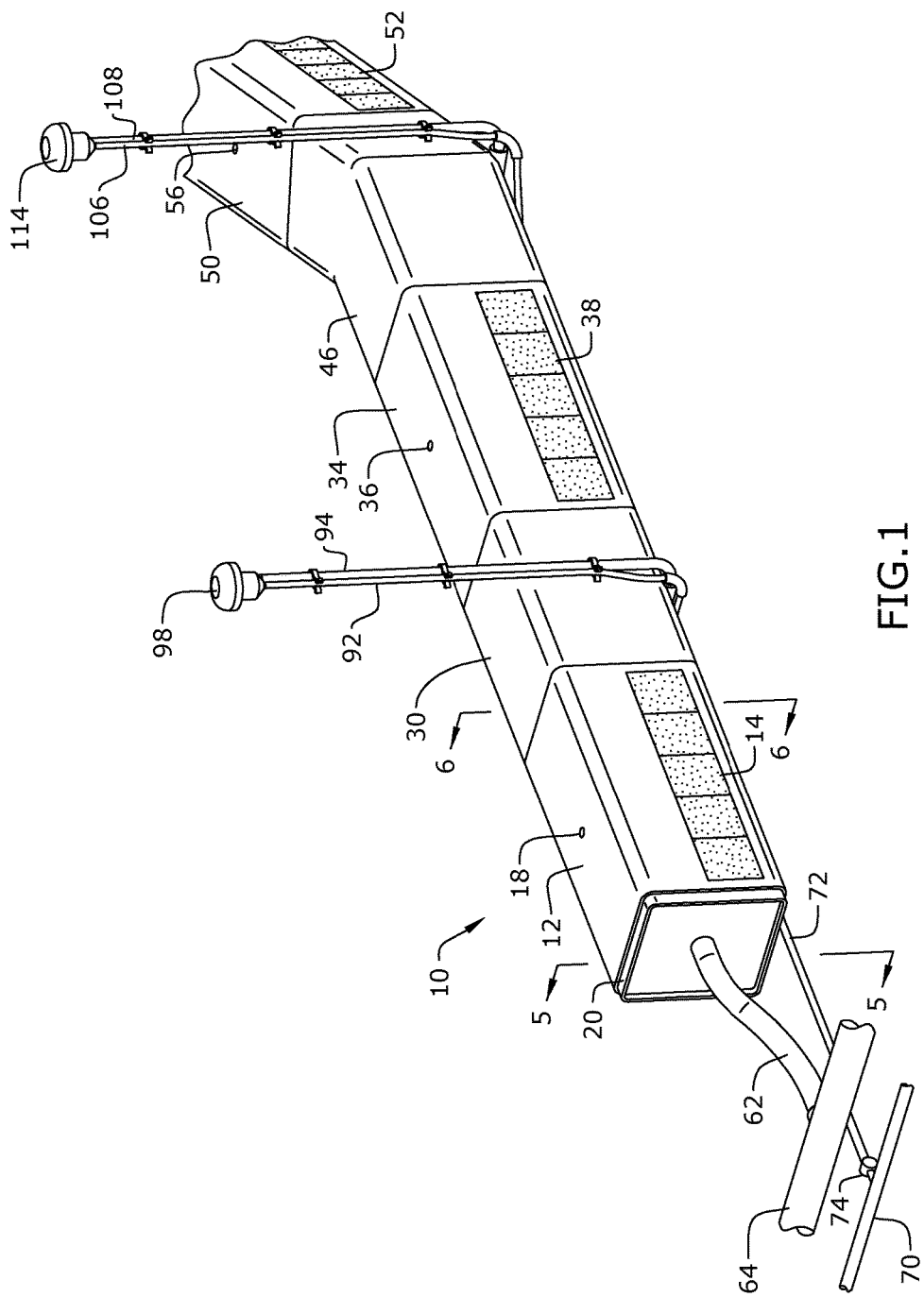
FIG. 1 shows a top perspective view of one embodiment of the present invention.
Figure 2:
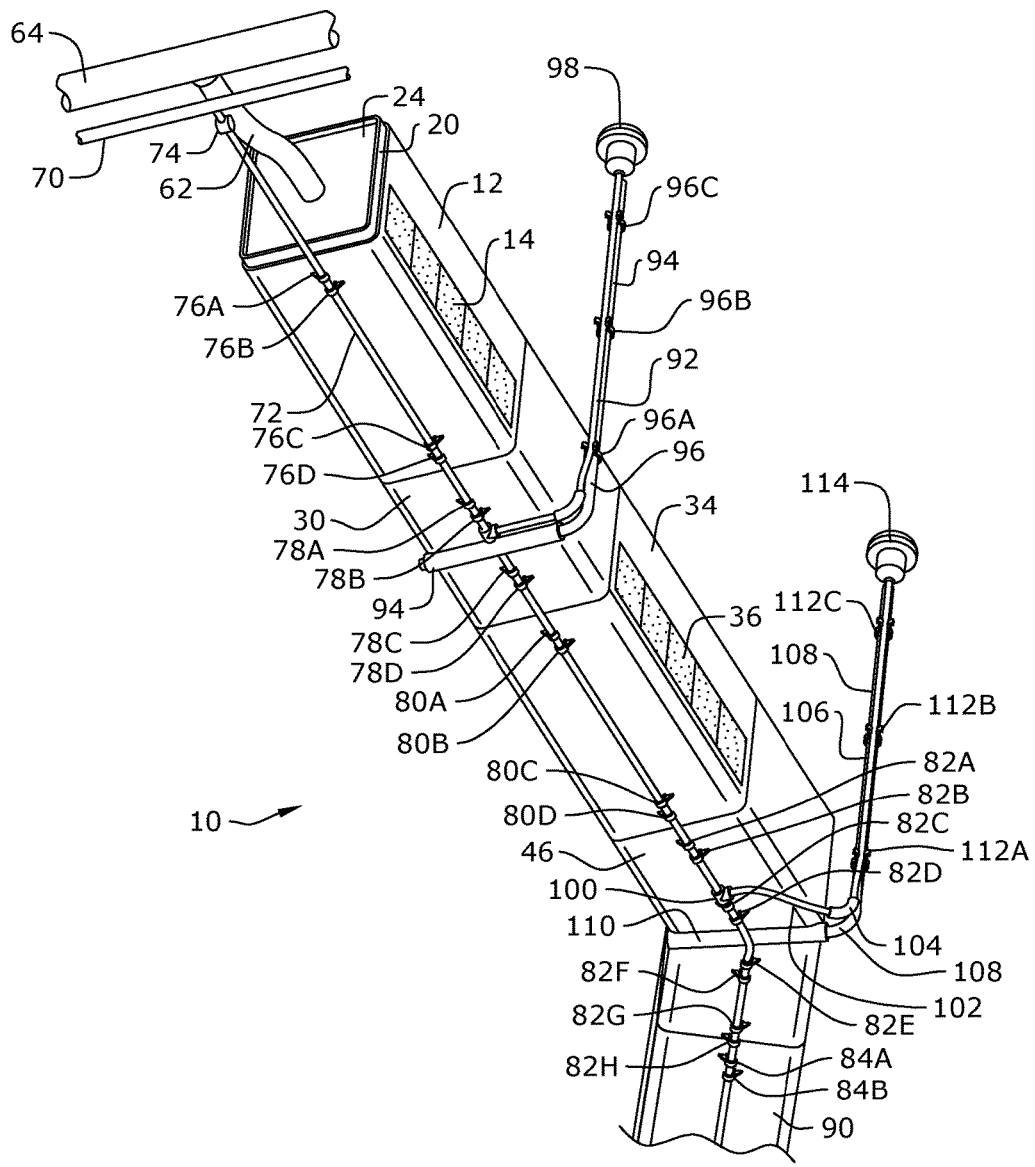
FIG. 2 shows a bottom perspective view of one embodiment of the present invention.
Figure 3:
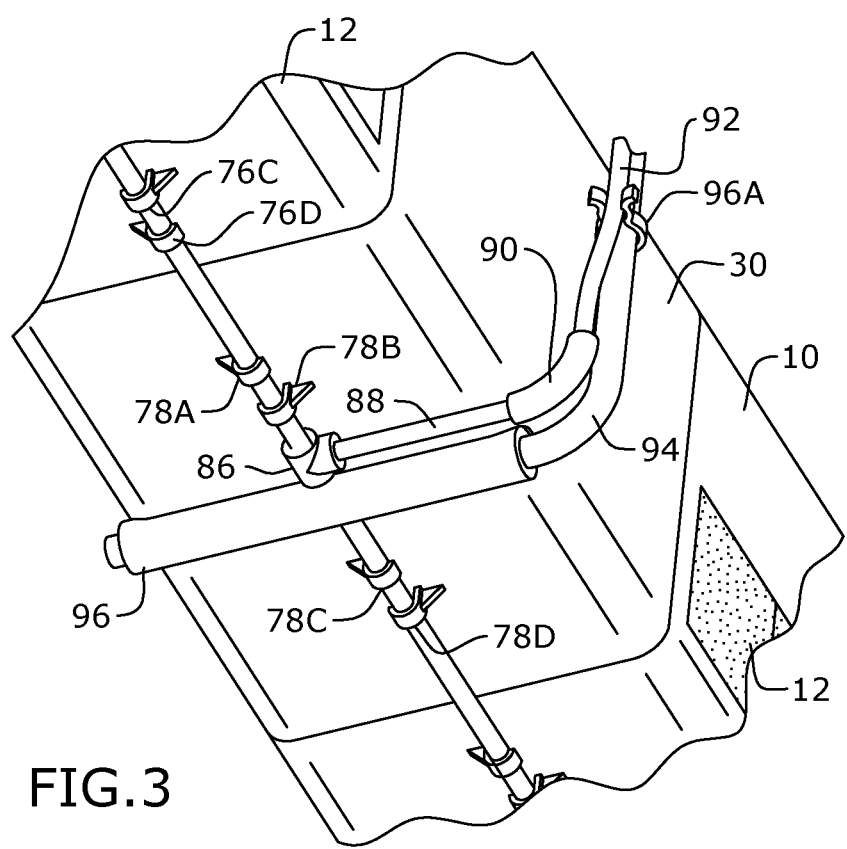
FIG. 3 shows a detail bottom perspective view of one embodiment of the present invention.

By way of example, and referring to FIG. 1, one embodiment of plant watering system 10 comprises first reservoir 12 formed with a first reservoir first plurality of water seepage panels 14 and a first reservoir second plurality of water seepage panels 16. First reservoir 12 further comprises knockout 18. First reservoir 12 is further attached to first end cap attachment lip 20 and to first coupler attachment lip 22.

First end cap attachment lip 20 is attached to first end cap 24. First end cap 24 further comprises first end cap attachment point 26. First coupler attachment lip 22 is attached to first reservoir coupler attachment lip 28. First reservoir coupler attachment lip 28 is attached to coupler 30. Coupler 30 is further attached to second reservoir coupler attachment insert 32.

Second reservoir 34 is formed with a second reservoir first plurality of water seepage panels 36 and a second reservoir second plurality of water seepage panels 38. Second reservoir 34 further comprises knockout 36. Second reservoir 36 is further attached to second coupler attachment lip 40 and to first elbow attachment lip 42.

First elbow attachment lip 42 is attached to first elbow insert 44. First elbow insert 44 is formed within elbow 46. Elbow 46 further comprises third reservoir attachment insert 48. Third reservoir attachment insert 48 is attached to third reservoir 50.

Third reservoir 50 is formed with a third reservoir first plurality of water seepage panels 52 and a third reservoir second plurality of water seepage panels 54. Third reservoir 50 further comprises knockout 56. Third reservoir 50 is further attached to end plate attachment lip 58. End plate attachment lip can be attached to end plate 60.

Figure 8:
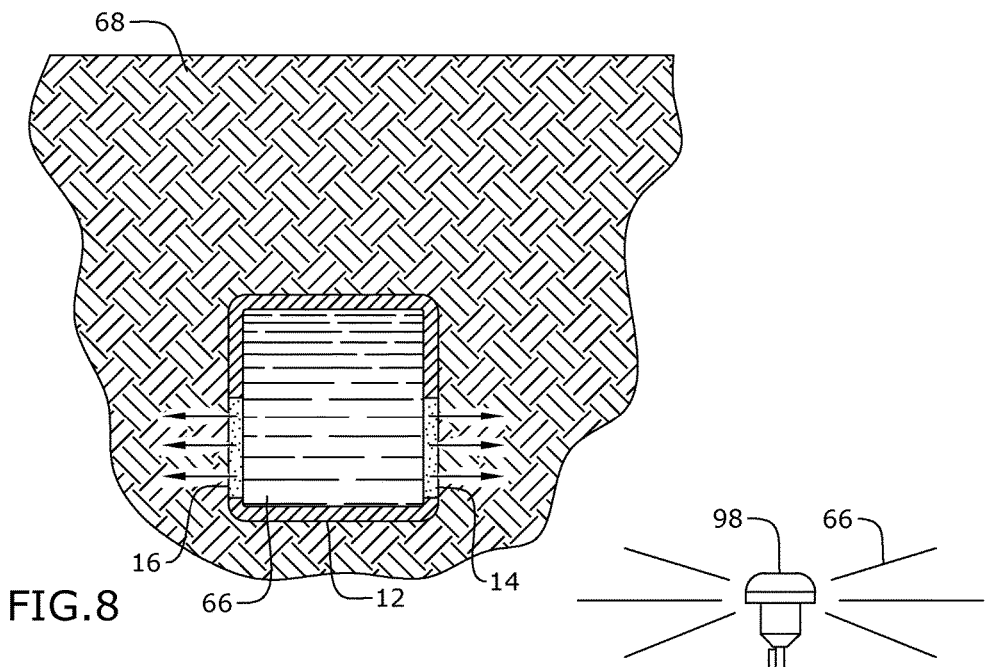
FIG. 8 shows a section detail view of one embodiment of the present invention taken along the reservoir.
Figure 9:
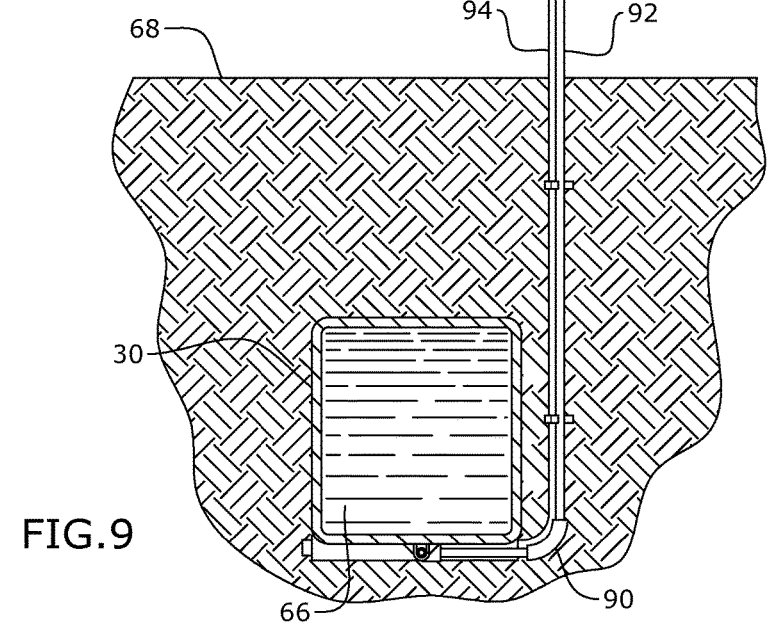
FIG. 9 shows a section detail view of one embodiment of the present invention taken along the coupling.

First end cap 24 is further attached to passive water fill tube 62. Passive water fill tube 62 is further attached to passive water manifold 64. Passive water manifold 64 can be used to fill plant watering system 10 with water 66. Turning to FIG. 8, water 66, seeps from the first reservoir first plurality of water seepage panels 14 and the first reservoir second plurality of water seepage panels 16 into soil 68.

Watering system 10 further comprises spraying manifold 70 attached to sprayer tube 72. Sprayer tube 72 is attached to regulator 74. Sprayer tube 72 is connected to first reservoir 12 with first reservoir tube holders 76A, 76B, 76C and 76D. Sprayer tube 72 is connected to coupler 30 with coupler tube holders 78A, 78B, 78C and 78D. Sprayer tube 72 is connected to second reservoir 34 with second reservoir tube holders 80A, 80B, 80C and 80D. Sprayer tube 72 is connected to elbow 46 with elbow tube holders 82A, 82B, 82C, 82D, 82E, 82F, 82G, and 82H. Sprayer tube 72 is connected to third reservoir 50 with third reservoir tube holders 84A and 84B.

Sprayer tube 72 is further connected to coupler tee joint 86. Coupler tee joint 86 is further attached to first coupler sprayer tube 88. First coupler sprayer tube 88 is connected to coupler tube elbow 90. Coupler tube elbow 90 is attached to second coupler sprayer tube 92. Coupler 30 adjacent to coupler L-rod 94 which can be joined with coupler attachment point 96. Coupler L-rod 94 is joined to second coupler sprayer tube 92 with coupler L-rod clips 96A, 96B and 96C. Second coupler sprayer tube is attached to coupler sprayer 98.

Sprayer tube 72 is further connected to elbow tee joint 100. Elbow tee joint 100 is further attached to first elbow sprayer tube 102. First elbow sprayer tube 102 is connected to elbow tube elbow 104. Elbow tube elbow 104 is attached to second elbow sprayer tube 106. Elbow 46 adjacent to elbow L-rod 108 which can be joined with elbow attachment point 110. Elbow L-rod 108 is joined to second elbow sprayer tube 106 with elbow L-rod clips 112A, 112B and 112C. Second elbow sprayer tube is attached to elbow sprayer 114.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A plant watering system, adapted to provide water to a plant both at and below a ground surface; the plant watering system comprising:
    a passive water manifold, connected to a fill tube;
    a first reservoir, connected to the fill tube;
    a first reservoir first plurality of water seepage panels and a first reservoir second plurality of water seepage panels, formed within the first reservoir and configured to disperse water from the passive water manifold below the ground surface;
    a spraying manifold, attached to a sprayer tube;
    a coupler sprayer, mechanically coupled to the sprayer tube; wherein the coupler sprayer is configured to disperse water from the spraying manifold above the ground surface;
    a coupler, attached to the first reservoir;
    a coupler L-rod, attached to the coupler with a coupler attachment point;
    a coupler tee joint, attached to the sprayer tube and a first coupler sprayer tube;
    a coupler tube elbow, attached to the first coupler sprayer tube and immediately adjacent to the coupler; and
    a second coupler sprayer tube, attached to the coupler tube elbow and the coupler sprayer.

2. The plant watering system of claim 1, further comprising:
    a second reservoir, attached to the coupler;
    a second reservoir first plurality of water seepage panels and a second reservoir second plurality of water seepage panels, formed within the second reservoir and configured to disperse the water from the passive water manifold below the ground surface.

3. The plant watering system of claim 2, further comprising:
    an elbow, attached to the second reservoir;
    an elbow L-rod, attached to the elbow with an elbow attachment point;
    an elbow tee joint, attached to the sprayer tube and a first elbow sprayer tube;
    an elbow tube elbow, attached to the first elbow sprayer tube and immediately adjacent to the elbow; and
    a second elbow sprayer tube, attached to the elbow tube elbow and an elbow sprayer;
    wherein the elbow sprayer is configured to disperse the water from the spraying manifold above the ground surface.

4. The plant watering system of claim 3, further comprising:
    a third reservoir, attached to the elbow;
    a third reservoir first plurality of water seepage panels and a third reservoir second plurality of water seepage panels, formed within the third reservoir and configured to disperse the water from the passive water manifold below the ground surface.

* * * * *